United States Patent [19]

Kastendieck et al.

[11] Patent Number: 4,672,194

[45] Date of Patent: Jun. 9, 1987

[54] PASSIVE PROXIMITY BATTERY CONTROL CIRCUIT FOR NIGHT VISION GOGGLES

[75] Inventors: William A. Kastendieck, Wylie; Thomas E. Broyles, Garland, both of Tex.

[73] Assignee: Varo, Inc., Garland, Tex.

[21] Appl. No.: 808,120

[22] Filed: Dec. 12, 1985

[51] Int. Cl.$^4$ .................... H01J 31/50; H01J 40/15
[52] U.S. Cl. .............................................. 250/213 VT
[58] Field of Search ............ 315/241 P, 362, 240, 315/241.5; 250/213 R, 213 A, 213 VT

[56] References Cited

U.S. PATENT DOCUMENTS

| | | | |
|---|---|---|---|
| 3,781,560 | 12/1973 | DeBurgh et al. | 250/213 VT |
| 3,787,688 | 1/1974 | Stone | 250/213 VT |
| 3,890,538 | 6/1975 | Iwata et al. | 315/241 P |
| 4,037,921 | 7/1977 | Cox | 250/213 R |
| 4,091,398 | 5/1978 | Iida et al. | 315/241 P |
| 4,117,376 | 9/1978 | Andrews | 315/362 |
| 4,158,155 | 6/1979 | Hauenstein | 315/241 P |
| 4,463,252 | 7/1984 | Brennan et al. | 250/213 VT |
| 4,510,419 | 4/1985 | Takematsu | 315/241 P |

*Primary Examiner*—David C. Nelms
*Assistant Examiner*—William L. Oen
*Attorney, Agent, or Firm*—Jerry W. Mills; Roger N. Chauza

[57] ABSTRACT

A circuit for automatically removing battery power from a night vision goggle (10) upon its detachment from a headgear (12). A magnet (34) on the headgear (12) is magnetically coupled to a magnetic reed switch (36) fixed to the goggle (10). On detachment of the goggle (10) from the headgear (12), the reed switch (36) switches battery current to a capacitively coupled coil (52) of a bistable latching relay (K1). Relay (K1) contacts (56, 62) are disconnected thus removing power from the image intensifier tube (40). On reattachment of the goggle (10) to the headgear (12), the On-Off switch (18) is cycled to pulse latching Relay K1 coil (64), thereby establishing a current path to the tube (40).

22 Claims, 5 Drawing Figures

PASSIVE PROXIMITY BATTERY CONTROL CIRCUIT FOR NIGHT VISION GOGGLES

RELATED APPLICATIONS

"Night Vision Goggle Headgear", by William A. Kastendieck and Richard T. Hart, filed concurrently herewith, Ser. No. 808,152;

"Adjustable Night Vision Goggle Mounting Bracket", by Richard T. Hart, filed concurrently herewith, Ser. No. 808,151;

"Quick Release Bracket For Night Vision Goggles", by William A. Kastendieck, Richard T. Hart and Wayne Isbell, filed concurrently herewith, Ser. No. 808,092, all assigned to the present assignee.

TECHNICAL FIELD OF THE INVENTION

The present invention relates in general to night vision goggles, and more particularly relates to battery control circuits associated therewith.

BACKGROUND OF THE INVENTION

While night vision goggles may find commercial applications in civilian use, the primary use of such goggles is with the military. Night vision goggles enable a person to see objects in the darkness, which objects could not otherwise be seen by the naked eye. The principle by which night vision goggles operate is that there is generally some source of external light, such as the stars or moon, which are capable of illuminating objects. While the naked eye may not be able to detect such illuminations reflected from an object, the reflections can be electrically amplified so as to be visible to the observer's eye.

Therefore, the principle by which night vision goggles can make objects viewable in darkness is the electrical amplification of reflected light. The image thereof is then displayed on a phosphorescent screen within the goggle. A battery powered photomultiplier or image intensifier tube is conventionally used to electrically amplify the light signals for presentation on the green phosphor coated screen. The image is monochromatic with the intensity of the phosphor representative of the amount of light reflected from the object.

An on-off switch is typically mounted on the night vision goggle to switch battery power to the photomultiplier tube during use, and for removing battery power from the tube during nonuse to conserve battery power. Because night vision goggles may be worn for extended periods of time, headgear is also provided for detachably mounting the goggles thereto, thereby allowing the wearer the free use of both hands. Night vision goggles are commonly detachably mounted to the headgear so as to be quickly removed should an emergency situation arise.

While the foregoing arrangement can greatly facilitate the nocturnal activity of a soldier, there are several inherent shortcomings. For example, if the battery is not switched off after the night vision goggles are removed from the headgear, the battery life can be substantially shortened. More importantly, if the night vision goggle is removed from the headgear, the green phosphorescent glow emanating from the exposed rear of the goggle can be quickly and easily spotted by others who are also wearing night vision goggles, thereby exposing the wearer to danger.

From the foregoing, it may be seen that a need has arisen for a mechanism which automatically removes the battery power from the night vision goggle circuit when detached from the headgear. Because such automatic power removal mechanism itself utilizes battery power, it is important that the power drain is extremely low. It is also important that the subsequent reengagement of the goggle to the headgear does not automatically reapply power to the goggle without an intentional act to apply such power. This is useful in field operations where a reengagement of the goggle to the headgear for storage purposes would power up the goggle and cause an unnecessary drain on the battery.

SUMMARY OF THE INVENTION

In accordance with the present invention, an electrical circuit for night vision goggles is provided which substantially reduces or eliminates the shortcomings previously associated with prior night vision goggles. In accordance with the present invention, a battery control circuit is responsive to the detachment of the night vision goggles from the headgear to disconnect the battery. The battery control circuit is responsive to a manual switch to reconnect the battery to appropriate circuits. In order to detect detachment of the night vision goggle, a magnet is fixed to the headgear, and a magnetic reed switch is attached to the night vision goggle. The magnet and magnetic reed switch are magnetically coupled when the night vision goggle is attached to the headgear.

A battery On-Off switch is provided on the night vision goggle, and is manually activated to control the application of battery power to the photomultiplier tube. A bistable magnetic latching relay is connected between the battery and the On-Off switch and is switched to the open state on detachment of the night vision goggle, thereby disconnecting the battery from the tube. The magnetic latching relay is placed in the other state, and the contact therein is closed when the manual switch is cycled from the Off position to the On position.

The dual coils of the magnetic latching relay are switchably coupled to the battery by respective capacitors, whereby the relay coils are pulsed to the desired state and thus sustaining dc current is not required.

BRIEF DESCRIPTION OF THE DRAWINGS

Further features and advantages of the present invention will become apparent from the description of an illustrative embodiment thereof, taken in conjunction with the accompanying drawing, in which.

DETAILED DESCRIPTION OF THE INVENTION

Figure 1:
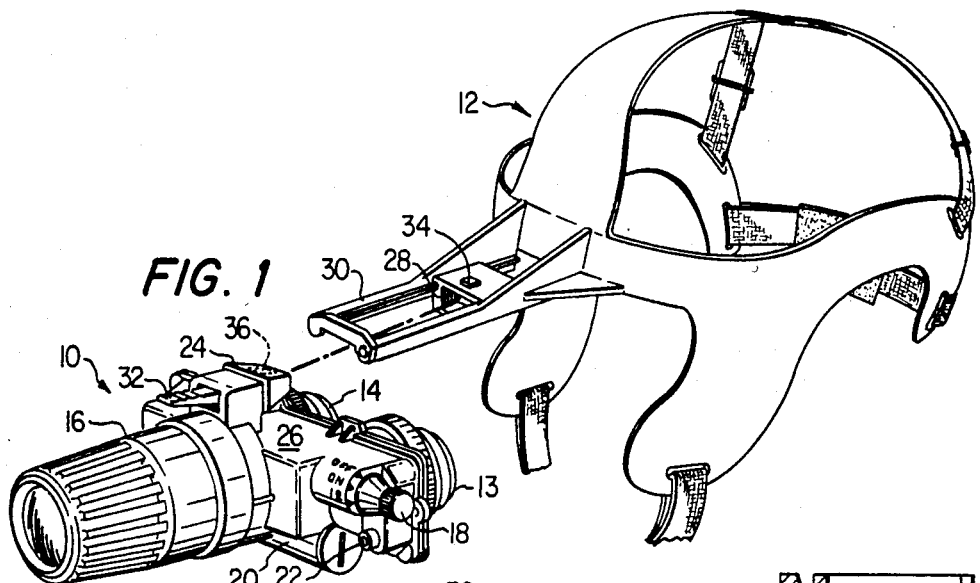
FIG. 1 is an isometric view of the mounting apparatus of the night vision goggle headgear, showing the detachment sensing means.

The application of the present invention is best understood by referring to FIG. 1 of the drawing. A night vision goggle, indicated generally by 10, is detachably mountable to a headgear 12. The night vision goggle is much like a pair of binoculars, including a pair of eye piece structures 13 and 14 optically coupled to internal image amplification apparatus. The faint light reflected from an object is projected through a lens assembly 16 and is also optically coupled to the image amplification apparatus. Night vision goggles of the type described are well known in the art, a particular such goggle being disclosed in U.S. Pat. No. 4,463,252.

The night vision goggle employed with the invention includes a multiposition manual switch 18 which switchably connects a battery 20 to an image intensifier tube (not shown) or other essential goggle circuitry. The manual switch 18 includes an Off position for disconnecting the battery 20 from all circuitry, and an On position for connecting the battery 20 to appropriate circuitry for allowing the wearer to observe objects in the darkness. The manual switch 18 also includes an IR position for activating a small infrared lamp 22 to provide a very small amount of light for viewing objects close up, such as reading a map.

A male engaging member 24 is fixed to the goggle frame 26 and is shaped for engagement within a mating receptacle 28 on a frame 30 molded as part of the headgear 12. The male member 24 includes a latching mechanism 32, cooperating with a catch (not shown) in the receptacle 28, thereby removably attaching the goggle 10 to the headgear 12.

In accordance with a primary feature of the invention, there is provided means for sensing the detachment of the goggle 10 from the headgear 12. The detachment sensing means comprises a ferromagnetic material, such as a magnet 34, and is shown mounted in the top sidewall of the receptacle 28. For clarity, a magnetic reed switch 36 is shown molded within the male member 24 in such a location that it is proximate the magnet 34 when the male member 24 is fully engaged and latched within the receptacle 28. As will be described more fully below, the magnetic reed switch 36 is operative to trigger other circuitry to disconnect the battery 20 when the night vision goggle 10 is detached from the headgear 12. The magnet 34 may be fixed to the receptacle 28 by cementing, or by other mechanical hardware. Similarly, the magnetic reed switch 36 is embedded within the male member 24, or also fixed such as by cementing or by the use of other hardware.

Figure 2:
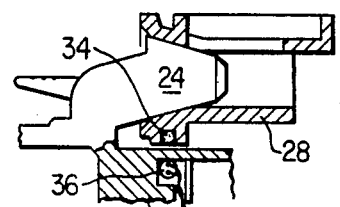
FIG. 2 is a partial cross-sectional view of the goggle stud and receptacle, showing the relative positions of the proximity sensing means.

In the preferred form of the invention, the relative positions of the magnet 34 and the reed switch 36 are shown in FIG. 2. The magnet is fastened with an adhesive within the bottom of the receptacle 28. The reed switch 36 is fixed by adhesive within a hole in the goggle frame 26. The reed switch 36 is located in the frame 26 directly below the magnet 34. Both proximity sensing elements 34 and 36 are typically embedded, and thus are not exposed to the environment.

The spacing between the magnet 34 and the reed switch 36 depends on the strength of the magnet. In the preferred form of the invention, the goggle frame 26 and headgear receptacle 28 are constructed so that the spacing between these proximity sensing elements is about 0.16 inch. The goggle frame 26 and receptacle 28 are formed of a plastic material so that the magnetic field in the vicinity of the reed switch 36 is not severely attenuated. Many types of reed switches and magnets are commercially available which can serve the proximity sensing function described herein.

Figure 3:
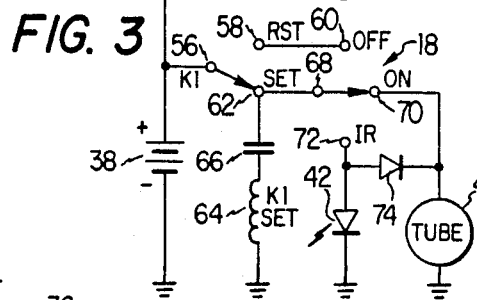
FIG. 3 is an electrical schematic drawing of the battery control circuit switchably connected for normal use.

With reference now to FIG. 3, there is shown the battery control circuit, together with the various switches for controlling the path of battery current to appropriate goggle circuits. A battery 38 is the source of power for the photomultiplier or image intensifier tube 40. Typically, two 1.5 volt batteries are connected in series to provide a 3 volt source. Provisions are also made for supplying power to a diode 42 which then emits infrared light. Diode 42 corresponds to the IR lamp 22 described above. With regard to the circuit connections, the positive terminal of battery 38 is connected to a pole 44, termed "Det", of a single pole double throw magnetically operated reed switch 36. Switch contact 44 is operative to remove power from the tube 40 when the goggle 10 is detached from the headgear 12. Contact 46 of magnetic switch 36, termed "Att", is connected to circuit ground through a 1000 ohm resistor 48. The pole 50 of magnetic reed switch 36 is connected to a latching relay coil 52 through a 100 microfarad capacitor 54. The value of capacitor 54 is selected, together with the resistance of relay coil 52, to yield a 2-5 ms current pulse through the coil.

The positive terminal of battery 38 is also connected to a pole 56 of a single pole double throw latching relay K1. Contact 58, termed "Rst", is associated with K1 reset coil 52, and is connected to contact 60, "Off", of the three position manually-operated switch 18. Contact 62, termed "Set", of latching relay K1 is associated with K1 coil 64, and is connected thereto through a 100 microfarad capacitor 66. The other terminal of latching relay coil 64 is connected to circuit ground. Contact 62 of K1 latching relay is also connected to pole 68 of the manually-operated switch 18. As noted in the diagram, pole 68 of the manually-operated switch 18 is rotatably switchable to contact 60 "Off", contact 70 "On" or contact 72 "IR". The On contact 70 of the manually-operated switch 18 is connected to the plate of the image intensifier tube 40. The cathode of the tube 40 is connected to circuit ground. The On contact 70 is also connected to the cathode of a diode 74. The IR contact 72 is connected in parallel to the anode of the diodes 42 and 74. The cathode of infrared emitting diode 42 is connected to circuit ground.

With regard to the operational aspects of the components comprising the battery control circuit, it is to be noted that when the goggle 10 is engagably attached to the receptacle 28 of the headgear 12, pole 50 of the magnetic reed switch 36 is connected to the Att contact 46. This switched arrangement is a result of the magnetic coupling of the magnet 34 and the reed switch 36. When the goggle 10 is detached from the headgear 12, the magnetic coupling is removed and pole 50 is switched to the Det contact 44. The switchable connection of pole 56 of latching relay K1 is governed by the energizing of K1 coil 52 or coil 64. When approximately 3 volts is impressed across K1 latching relay coil 52, pole 56 is switched to Rst contact 58. Conversely, when 3 volts is impressed across K1 relay coil 64, pole 56 is switched to Set contact 62.

With regard to the functional details of the battery control circuit, it is to be noted that FIG. 3 illustrates the position of the various switches and relays when the night vision goggle 10 is engagably attached to the headgear 12. Also, the manually-operated switch 18 has been set by the operator to the On position so as to view objects in the darkness. In accordance with this mode of operation, the image intensifier tube 40 is supplied with power from battery 38 through latching relay pole 56 and Set contact 62, as well as through the manually-operated switch ple 68 and On contact 70. It should also be noted that if pole 56 of the K1 relay were connected to the Rst contact 58, the switching of manually-operated switch pole 68 to the Off contact 60 would cause the charging of capacitor 66 and a corresponding current flow through K1 relay coil 64. As a result, K1 latching relay pole 56 would be switched back to the Set contact 62. When subsequently switched to the On position, battery current would again flow from the battery 38 through the K1 Set contact 62 and then to the image intensifier tube 40. Thus, irrespective of the state of the magnetic latching relay K1, a battery circuit to the tube 40 will be provided when the manually-operated switch is rotated to the On position.

In the event it is decided to deactivate the night vision goggle 10, it is only necessary to turn the manually-operated switch 18 to the Off position. The current path from the battery 38 to the image intensifier tube 40 is thereby disconnected, and no battery power is consumed by the circuit. It is noteworthy that with this arrangement of switches, the battery 38 is yet connected to the capacitor 66 and K1 latching relay coil 64. However, because capacitor 66 blocks the flow of dc current therethrough, no sustaining current flows in the control circuit.

Assuming once again the switch configuration as shown in FIG. 3, should the night vision goggle 10 become detached from the mating receptacle 28 of the headgear 12, the magnetically operated reed switch 36 will be removed from the magnetic field of the magnet 34. As a result, pole 50 of magnetic reed switch 36 will make contact with Det contact 44. The operation of the magnetic reed switch 36 allows the charging of capacitor 54 and a momentary current pulse the pass through K1 relay coil 52. Irrespective of the switched position of the manually-operated switch 18, the current pulse will cause pole 56 of latching relay K1 to switch to the Rst contact 58. K1 switch pole 56, thus connected to the battery 38, will operate into an open circuit. As a result of the detachment of the night vision goggle 10 from the headgear 12, the battery 38 is disconnected from the image intensifier tube 40. As noted above, this not only conserves battery energy, but also extinguishes the internal illumination of the phosphor screen which can be seen by others with night vision goggles.

Figure 4:
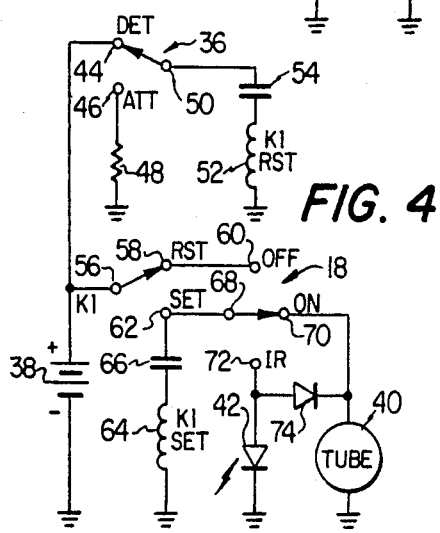
FIG. 4 is the electrical schematic drawing of the battery control circuit of FIG. 3 after detachment of the goggle from the headgear.

FIG. 4 illustrates the battery control circuit with the switches and relays connected after the goggle 10, which was switched On, was detached from the headgear 12. As noted above, the battery 38 is completely isolated from the image intensifier tube 40, and the reed switch pole 50 is switched to Det contact 44. Moreover, with the switches and relays in the position noted in FIG. 4, capacitor 54 blocks dc current flow, thereby eliminating any sustaining dc current from the battern 38 to circuit ground. With the provision of the bistable latching relay K1, battery current is only required during the charging of capacitors 54 and 66 to place such relay in the respective reset and set states. Also, because relay K1 remains in a latched condition without continuous excitation of the coils 52 and 64, an energy efficient circuit is provided. This is highly important in field operated equipment where batteries may not be readily available.

Continuing with the description, if the night vision goggle 10 is engagably attached to the receptacle 28 of the headgear 12, the pole 50 of the magnetic reed switch 36 will be activated by the magnet 34 and will again connect with Att contact 46. The only ramification of this switch action is the connection of capacitor 54 to resistor 48, thereby discharging the capacitor. Latching relay K1 remains in the reset position, and battery power is yet removed from the image intensifier tube 40. This aspect is important as it eliminates the possibility of discharging the battery 38 should the goggle 10 be reengaged with the headgear 12 and stored without rotating the manually-operated switch 18 to the Off position. In order to reactivate the night vision goggle 10, the manually-operated switch 18 must be cycled to the Off position, and then again to the On position, as shown by arrow 71 in FIG. 5.

Figure 5:
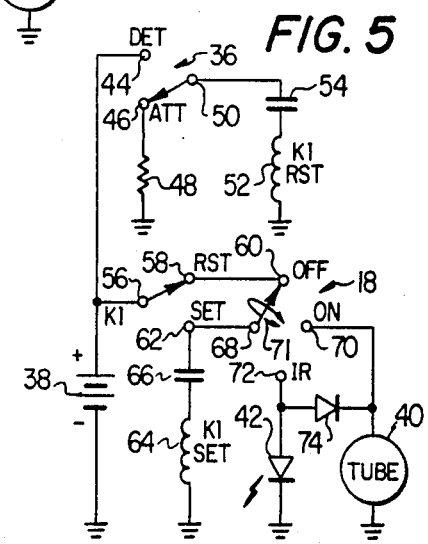
FIG. 5 is the electrical schematic drawing of the battery control circuit of FIG. 3 illustrating the cycling of the On-Off switch to reconnect the battery to the tube.

FIG. 5 illustrates the battery control circuit just before the pole 68 of the manually-operated switch 18 makes contact with the Off contact 60. When the pole 68 of the manually-operated switch 18 contacts Off contact 60, battery current flows through the Rst contact 58 of K1 latching relay, through the Off contact 60 and pole 68 of the manually-operated switch 18 to capacitor 66. The charging of capacitor 66 by the battery current allows a pulse of current to flow through K1 latching relay coil 64 switching the pole 56 thereof to the Set contact 62.

After the manually-operated switch 18 is cycled, the pole 68 thereof is connected to On contact 70, thereby providing an electrical circuit from the battery 38 to the image intensifier tube 40. Conventional night vision goggles are provided with the manually-operated On-Off switch 18. It should be appreciated, therefore, that additional manually operated switches are not required, which additional switches could be confusing or would require further knowledge of the operation thereof. In addition, the foregoing battery control circuit does not hamper, or otherwise alter the function of the On-Off switch, as heretofore known. For example, when the night vision goggle 10 is engagably attached to the headgear 12, the placement of the manually-operated switch 18 in the Off position will always remove battery power from the image intensifier tube 40. Similarly, when the manually-operated switch 18 is placed in the On position, the image intensifier tube 40 will always be powered by the battery 38. The only additional operation which must be learned by the wearer is the cycling of the manually-operated switch 18 in the Off-On sequence to render the goggle functional when reattached to the headgear 12.

A third position of the manually-operated switch 18 is generally provided, and is labeled IR. The IR switch position functions exactly like that as the On position, except, in addition to the powering of the image intensifier tube 40, infrared light is emitted from diode 42. With reference back to FIG. 3 of the drawings, when pole 68 of the manually-operated switch 18 is switched to IR contact 72, current flows from the battery 38 through infrared light emitting diode 42. In addition, current flows through diode 74, thereby supplying power to the image intensifier tube 40. The infrared diode 42 is located at the front of the goggle and directed so that it illuminates closely located objects in front of the goggle lens 16.

From the foregoing, a highly efficient battery control circuit is provided. The circuit provides for magnetic coupling between the goggle and the headgear and thus is responsive to the detachment thereof. The battery control circuit further includes a bistable latching means which requires no power when in either state, and which is operative to connect or disconnect the image intensifier tube from the battery. The bistable device comprises a magnetic latching relay, the coils of which are capacitively coupled to the battery and are thereby pulsed when connected thereto. The On-Off switch conventionally provided with the night vision goggle controls the battery power supplied to the image intensifier tube when the goggle is attached to the headgear. In addition, the On-Off switch can be simply cycled to reactivate the goggle image intensifier tube when the goggle is reattached to the headgear.

The preferred embodiment of the invention has been described above in detail. However, various modifications and additions or changes to the battery control circuit are undoubtedly possible by those skilled in the art without departing from the spirit and scope of the invention as claimed hereinbelow.

What is claimed is:

1. A night vision goggle assembly, comprising:
   a headgear frame;
   a goggle with an On-Off switch-controlled electrical circuit;
   a bracket on said headgear frame for removable attachment of said goggle; and
   circuit means responsive to the removal of said goggle from said bracket for automatically deactivating said electrical circuit.

2. The goggle assembly of claim 1 wherein said circuit means includes proximity sensor means for sensing the detachment of said goggle from said headgear.

3. The goggle assembly of claim 2 wherein said proximity sensor means comprises a magnetically operated circuit.

4. The goggle assembly of claim 3 wherein said proximity sensor means comprises a magnet and a magnetic operated relay.

5. The goggle assembly of claim 1 further including means for preventing the reactivation of said electrical circuit upon the reattachment of the goggle to the headgear.

6. The goggle assembly of claim 5 further including latching means responsive to the reattachment of said goggle to said headgear, and responsive to the cycling of said On-Off switch for reactivating said electrical circuit.

7. The goggle assembly of claim 6 wherein said latching means comprises a bistable circuit element operative to direct electrical current to said electrical circuit in one state, and operative to remove current therefrom when in another state.

8. The goggle assembly of claim 7 wherein said bistable circuit element draws no energy when in either said state.

9. The goggle assembly of claim 8 wherein said bistable element comprises a magnetic latching relay.

10. The goggle assembly of claim 9 further including means for pulsing said relay.

11. The goggle assembly of claim 10 wherein said means for pulsing comprises a capacitor switchably connected to a source of electrical power.

12. The goggle assembly of claim 7 further including means for activating said bistable element to deactivate said electrical circuit when said goggle is removed from the headgear, and means for pulsing said bistable element for activating said circuit when said goggle is reattached to said headgear and when said On-Off switch is cycled.

13. A circuit for use with a night vision goggle having a battery operated image intensifier, and detachably mounted to a headgear, comprising:
   an On-Off switch operative to selectively supply battery current to said image intensifier;
   magnetic coupling means between said goggle and said headgear; and
   magnetic responsive means responsive to the proximity of said magnetic coupling means for interrupting current through said switch when said goggle is detached from the headgear.

14. The circuit of claim 13 further including switch means connected between said magnetic responsive means and said On-Off switch for maintaining the interruption of battery current after reattachment of said goggle to said headgear.

15. A battery deactivating circuit for use with a night vision goggle removably attachable to a headgear, comprising:
   switch means for switchably connecting a battery to an image intensifier; and
   bistable means responsive to a first signal corresponding to the detachment of said goggle from said headgear for operating said switch means and disconnecting said battery from said image intensifier, and responsive to a different signal for operating said switch means and connecting said battery to said image intensifier.

16. The battery deactivating circuit of claim 15 wherein said first signal is automatically generated by a magnetic coupling means connected between said goggle and said headgear, and said different signal is manually generated.

17. The battery deactivating circuit of claim 15 wherein said bistable means is of the type which consumes no battery power when in a stable state.

18. The battery deactivating circuit of claim 17 wherein said bistable means comprises a magnetic latching relay.

19. A night vision goggle assembly, comprising:
   a night vision goggle;
   a headgear to which said goggle is removably mountable;
   a magnetic switch mounted to said goggle;
   a magnet attached to said headgear, and magnetically coupled to said magnetic switch when said goggle is attached to said headgear;
   a latching relay with contacts, and with a first and second coil responsive to electrical excitation thereof for switching a switch pole to a respective reset contact and a set contact of said latching relay;
   a first parallel circuit including said first coil in series with a first capacitor and switchable by said magnetic switch to a battery when said goggle is detached from said headgear, and including a resistor switchable by said magnetic switch to said first capacitor and said first coil when said goggle is attached to the headgear;
   a manually-operated On-Off switch on said goggle, said On-Off switch including an On contact and an Off contact;
   an image intensifier connectable to said On contact;

an second parallel circuit including a second capacitor in series with said second coil and switchable to said battery by the contacts of said latching relay, and including a first means for connecting said On contact to said battery through said latching relay contacts, and means for connecting said second capacitor and said second coil to said battery through said Off contact and through the contacts of said latching relay.

20. A method of automatically controlling a battery powered image intensifier in a night vision goggle removably attachable to a headgear, and having a manually operated On-Off switch, comprising the steps of:

automatically disconnecting the battery from the image intensifier when the goggle is removed from said headgear;

reattaching the night vision goggle to the headgear; and connecting the battery to the image intensifier by manually cycling the On-Off switch.

21. The method of claim 20 wherein said disconnecting step is carried out by sensing the proximity of the night vision goggle with respect to the headgear.

22. The method of claim 21 wherein the sensing step is carried out by sensing magnetic coupling between the goggle and the headgear.

* * * * *